(12) United States Patent
Luo et al.

(10) Patent No.: US 8,280,671 B2
(45) Date of Patent: Oct. 2, 2012

(54) COMPRESSIVE DATA GATHERING FOR LARGE-SCALE WIRELESS SENSOR NETWORKS

(75) Inventors: Chong Luo, Shanghai (CN); Feng Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 421 days.

(21) Appl. No.: 12/696,415

(22) Filed: Jan. 29, 2010

(65) Prior Publication Data

US 2011/0191496 A1 Aug. 4, 2011

(51) Int. Cl.
*G01R 31/00* (2006.01)

(52) U.S. Cl. ........................................................ 702/118

(58) Field of Classification Search .................. 702/117, 702/118, 146, 182–185, 188
See application file for complete search history.

(56) References Cited

U.S. PATENT DOCUMENTS

| 7,271,747 | B2 | 9/2007 | Baraniuk et al. |
| 2010/0080473 | A1 | 4/2010 | Han et al. |
| 2011/0218759 | A1* | 9/2011 | Jin ................................ 702/150 |

OTHER PUBLICATIONS

Acimovic, et al., "Adaptive Distributed Algorithms for Power-Efficient Data Gathering in Sensor Networks", retrieved on May 31, 2010 at http://www-ee.uta.edu/Online/Tjuatja/EE5369/Thermpon_paper3.pdf, IEEE, Proceedings of International Symposium on Wireless Sensor Networks (WirelessCom), Hawaii, vol. 2, Jun. 2005, 6 pgs.

Bajwa, et al., "Compressive Wireless Sensing", retrieved on May 31, 2010 at <<http://www.ece.wisc.edu/~nowak/ipsn06a.pdf>>, ACM, Proceedings of International Conference on Information Processing in Sensor Networks (IPSN), Nashville, TN, Apr. 2006, 9 pgs.

Baraniuk, "Compressive Sensing", retrieved on May 31, 2010 at <<http://users.isr.ist.utl.pt/~aguiar/CS_notes.pdf>>, IEEE Signal Processing Magazine, vol. 24, No. 4, Jul. 2007, 9 pgs.

Candes, et al., "An Introduction to Compressive Sampling", retrieved on May 31, 2010 at <<http://citeseerx.ist.psu.edu/viewdoc/download;jsessionid=882C19F75EE36E6F28E24CE415302785?doi=10.1.1.151.9141&rep=rep1&type=pdf>>, IEEE Signal Processing Magazine, vol. 21, Mar. 2008, pp. 21-30.

Candes, et al., "Robust Uncertainty Principles: Exact Signal Reconstruction from Highly Incomplete Frequency Information", retrieved on May 31, 2010 at <<http://www-stat.stanford.edu/~candes/papers/ExactRecovery.pdf>>, IEEE Transactions on Information Theory, vol. 52, Aug. 2005, 41 pgs.

Chen et al., "Chain-type Wireless Sensor Network for Monitoring Long Range Infrastructures: Architecture and Protocols", Intl Journal of Distributed Sensor Networks, vol. 4, Oct. 2008, pp. 287-314.

Chou, et al., "A Distributed and Adaptive Signal Processing Approach to Reducing Energy Consumption in Sensor Networks", retrieved on May 31, 2010 at <<http://citeseerx.ist.psu.edu/viewdoc/download?doi=10.1.1.13.377&rep=rep1&type=pdf>>, IEEE INFOCOM, San Francisco, CA, Apr. 2003, 9 pgs.

(Continued)

*Primary Examiner* — Edward Raymond
(74) *Attorney, Agent, or Firm* — Lee & Hayes, PLLC

(57) ABSTRACT

Techniques for data gathering in large-scale wireless sensor networks are described. A data collection device receives aggregate data from at least one sensor node of a group of N sensor nodes. The aggregate data includes M weighted sums. Each of the M weighted sums includes a respective sum of N products each of which being a product of a respective coefficient and a sensor reading from a respective one of the N sensor nodes. M and N are positive integers and M is less than N. Computation is performed on the aggregate data to recover sensor readings from the N sensor nodes.

20 Claims, 14 Drawing Sheets

OTHER PUBLICATIONS

Ciancio, et al., "Energy-Efficient Data Representation and Routing for Wireless Sensor Networks Based on a Distributed Wavelet Compression Algorithm", retrieved on May 31, 2010 at <<http://citeseerx.ist.psu.edu./viewdoc/download;jsessionid=F9E9FD135162A79F09E496E47555C6F3?doi=10.1.1.74.3887&rep=rep1&type=pdf>>, ACM, Proceedings of International Conference on Information Processing in Sensor Networks (IPSN), Nashville, TN, Apr. 2006, 8 pgs.

Cortial, et al., "Compressed Sensing and Time-Parallel Reduced-Order Modeling for Structural Health Monitoring using a DDDAS", retrieved on May 31, 2010 at <<http://graphics.stanford.edu/projects/lgl/papers/cfgr-cstpromshmdddas-iccs07/cfgr-cstpromshmdddas-iccs07.pdf>>, Springer-Verlag Berlin, Lecture Notes In Computer Science vol. 4487, Proceedings of International Conference on Computational Science, Beijing, CN, May 29, 2007, 8 pgs.

Cristescu, et al., "Network Correlated Data Gathering with Explicit Communication: NP-Completeness and Algorithms", retrieved on May 31, 2010 at <<http://www.its.caltech.edu/~razvanc/PUBLICATIONS/CristescuBVW.pdf>>, IEEE Press, IEEE/ACM Transactions on Networking (TON), vol. 14, No. 1, Jun. 2005, 24 pgs.

Cristescu, et al., "On Network Correlated Data Gathering", retrieved on May 31, 2010 at <<http://www.its.caltech.edu/~razvanc/PUBLICATIONS/CritescuBVInfocom.pdf>>, IEEE INFOCOM, Hong Kong, CN, Mar. 2004, 12 pgs.

Donoho, "Compressed Sensing", retrieved on May 31, 2010 at <<http://citeseerx.ist.psu.edu/viewdoc/download?doi=10.1.1.95.3320&rep=rep1&type=pdf>>, Stanford University, Department of Statistics, Technical Report, Sep. 14, 2004, pp. 1-34.

Donoho, et al., "Stable Recovery of Sparse Overcomplete Representations in the Presence of Noise", retrieved on May 31, 2010 at <<http://citeseerx.ist.psu.edu/viewdoc/download?doi=10.1.1.84.7896&rep=rep1&type=pdf>>, IEEE Transactions on Information Theory, vol. 52, No. 1, Jan. 2006, 42 pgs.

Gupta, et al., "Efficient Gathering of Correlated Data in Sensor Networks", retrieved on May 31, 2010 at <<http://portal.acm.org/citation.cfm?id=1062739&dl=GUIDE&coll=GUIDE&CFID=92220491&CFTOKEN=22712643>>, ACM, Proceedings of International Symposium on Mobile Ad Hoc Networking and Computing (MobiHoc), Urbana-Champaign, Illinois, May 2005, pp. 402-413.

Gupta, et al., "The Capacity of Wireless Networks", retrieved on May 31, 2010 at <<http://decision.csl.illinois.edu/~prkumar/ps_files/capacity_final.ps>>, IEEE Transactions on Information Theory, vol. 46, No. 2, Mar. 2000, 48 pgs.

Haupt, et al., "Compressed Sensing for Networked Data", retrieved on May 31, 2010 at <<http://www.ece.mcgill.ca/~mrabba1/pubs/cs_net.pdf>>, IEEE Signal Processing Magazine, vol. 25, No. 2, Dec. 2007, 20 pgs.

Hern, "Robustness of Compressed Sensing in Sensor Networks", retrieved on May 31, 2010 at <<http://repository.tamu.edu/bitstream/handle/1969.116915/BrettHern_UndergraduateThesis.pdf?sequence=1>>, Texas A and M University, Department of Electrical Engineering, Senior Honors Thesis, Apr. 2008, pp. 1-42.

Hua et al., "Correlated Data Gathering in Wireless Sensor Networks Based on Distributed Source Coding", Int. Journal Sensor Networks, vol. 4, Nos. 1/2, Jul. 2008, pp. 13-22.

Lee, et al., "Spatially-Localized Compressed Sensing and Routing in Multi-Hop Sensor Networks", retrieved on May 31, 2010 at <<http://anrg.usc.edu/~pattern/papers/LeePatternSathiamoorthyKrishnamachariOrtega_GSN09.pdf>>, Springer-Verlag Berlin, Lecture Notes in Computer Science vol. 5659, Proceedings of International Conference on GeoSensor Networks, Jul. 2009, 10 pgs.

Marco, et al., "On the Many-to-One Transport Capacity of a Dense Wireless Sensor Network and the Compressibility of Its Data", retrieved on May 31, 2010 at <<http://www.ist.caltech.edu/~idaniel/Academic%20Files/IPSN03.pdf>>, Springer, Lecture Notes in Computer Science, Proceedings of International Conference on Information Processing in Sensor Networks (IPSN), New York, NY, Apr. 2003, pp. 1-16.

"NDBC TAO: CTD Data Display and Delivery", retrieved on May 31, 2010 at <<http://tao.noaa.gov/refreshed/ctd_delivery.php>>, National Data Buoy Center, Dec. 2009, pp. 1.

"Network Simulator ns-2", retrieved on May 31, 2010 at <<http://www.isi.edu/nsnam/ns/>>, 2010, pp. 1-2.

Quer, et al., "On the Interplay Between Routing and Signal Representation for Compressive Sensing in Wireless Sensor Networks", retrieved on May 31, 2010 at <<http://ita.ucsd.edu/workshop/09/files/paper/paper_1319.pdf>>, Information Theory and Applications Workshop (ITA), San Diego, CA, Feb. 2009, pp. 1-10.

Rabbat, et al., "Decentralized Compression and Predistribution via Randomized Gossiping", retrieved on May 31, 2010 at <<http://www.ece.wisc.edu/~nowak/ipsn06b.pdf>>, ACM, Proceedings of International Conference on Information Processing in Sensor Networks (IPSN), Nashville, TN, Apr. 2006, 9 pgs.

Scaglione, et al., "On the Interdependence of Routing and Data Compression in Multi-Hop Sensor Networks", retrieved on May 31, 2010 at <<http://www.media.mit.edu/resenv/classes/MAS965/readings/scaglione02.pdf>>, ACM, Proceedings of International Conference on Mobile Computing and Networking (MOBICOM), Atlanta, GA, Sep. 2002, 8 pgs.

Slepian, et al., "Noiseless Encoding of Correlated Information Sources", retrieved on May 31, 2010 at <<http://ieeexplore.ieee.org/stamp/stamp.jsp?tp=&arnumber=1055037>>, IEEE Transactions on Information Theory, vol. IT-19, No. 4, Jul. 1973, pp. 471-480.

Tilak, et al., "Infrastructure Tradeoffs for Sensor Networks", retrieved on May 31, 2010 at <<http://www.cs.binghamton.edu/~sameer/pubs/main-wsna02.pdf>>, ACM, Proceedings of International Workshop on Wireless Sensor Networks and Applications, Atlanta, GA, Jun. 2002, 11 pgs.

Yoon, et al., "The Clustered AGgregation (CAG) Technique Leveraging Spatial and Temporal Correlations in Wireless Sensor Networks", retrieved on May 31, 2010 at <<http://portal.acm.org/citation.cfm?id=1210672&dl=GUIDE&coll=GUIDE&CFID=92220376&CFTOKEN=10213998>>, ACM, Transactions on Sensor Networks (TOSN), vol. 3, No. 1, Article 3, Mar. 2007, pp. 1-39.

Yuen, et al., "A Distributed Framework for Correlated Data Gathering in Sensor Networks", retrieved on May 31, 2010 at <<http://citeseerx.ist.psu.edu/viewdoc/download?doi=10.1.1.117.6471&rep=rep1&type=pdf>>, IEEE Transactions on Vehicular Technology, vol. 57, No. 1, Jan. 2008, pp. 578-593.

\* cited by examiner

COMPRESSIVE DATA GATHERING FOR LARGE-SCALE WIRELESS SENSOR NETWORKS

BACKGROUND

A sensor network, such as a wireless sensor network, typically includes spatially distributed autonomous sensor nodes to monitor physical or environmental conditions, such as temperature, humidity, pressure, sound, vibration, motion or pollutants. Applications range from habitat monitoring and traffic control to surveillance. Each sensor node includes one or more sensors, and is typically equipped with a radio transceiver or other wireless communication device as well as a power source such as a battery. Sensor readings are transmitted by the sensor nodes and received by a data sink, or data collection device, either directly or via one or more other sensor nodes. The received sensor readings are processed by the data sink or forwarded on by the data sink to a network, computing device, or communication device.

In general, large scale sensor data gathering is accomplished through multi-hop routing from individual sensor nodes to the data sink. Successful deployment of such large scale sensor networks typically faces two major challenges, namely: reduction of global communication cost and energy consumption load balancing.

The need for global communication cost reduction arises from the fact that such sensor networks typically include hundreds to thousands of sensors, generating tremendous amount of sensor data to be delivered to the data sink. It is very much desired to take full advantage of the correlations among the sensor data to reduce the cost of communication. Existing approaches adopt in-network data compressions, such as entropy coding or transform coding, to reduce global traffic. However, these approaches tend to introduce significant computation and control overheads that often are not suitable for sensor network applications.

The need for energy consumption load balancing arises from the fact that large-scale sensor networks typically require multi-hop data transmission. FIG. 1 illustrates a large-scale wireless sensor network 100 where sensors are densely deployed in the region of interest to monitor the environment on a regular basis. Suppose N sensors, denoted as $s_1, s_2, s_3 \ldots s_N$ form a multi-hop route to the data sink 102, with $d_j$ denoting the readings obtained by the sensor in node $s_j$. A typical way of transmitting $d_j$, j=1, 2, 3 . . . N to the data sink 102 is through multi-hop relay as depicted in FIG. 1. In particular, node $s_1$ transmits sensor reading $d_1$ to $s_2$, node $s_2$ transmits sensor readings $d_2$ from its own sensor as well as the relayed reading $d_1$ to node $s_3$, and so on. At the end of the route, node $s_N$ transmits all N readings to the data sink 102. It can be observed that the closer a sensor node is to the data sink, the more energy is consumed. This is because not only the node transmits the readings of its own sensor but also all the relayed sensor readings. As a result, the sensor nodes closer to the data sink 102 tend to run out of energy, and the lifetime of the sensor network will be significantly shortened.

SUMMARY

Techniques for data gathering in large-scale wireless sensor networks are described. In one aspect, a first sensor node transmits to a second sensor node a first value that is a product of a first pseudo-random number and the sensor reading of a first sensor. The second sensor node transmits a sum of the first value and a second value, where the second value is a product of a second pseudo-random number and the sensor reading of a second sensor. The transmitted sum of the first and second values will eventually be received and processed by a data collection device.

This summary is provided to introduce concepts relating to wireless sensor network data gathering. These techniques are further described below in the detailed description. This summary is not intended to identify essential features of the claimed subject matter, nor is it intended for use in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

The present disclosure describes techniques for compressive data gathering in large-scale wireless sensor networks and aims to address the two major challenges as outlined above. Firstly, it is believed the proposed compressive data gathering scheme is able to achieve substantial sensor data compression without introducing excessive computation and control overheads. Secondly, it is also believed the proposed scheme is able to disperse the communication costs to all sensor nodes along a given sensor data gathering route. This will result in a natural load balancing and thus prolong the lifetime of the sensor network.

By applying compressive data gathering, or compressive sampling, to in-network data compression, a number of benefits can be achieved. Such benefits include simple encoding process, less inter-node data exchange, and decoupling of compression from routing. In addition, compressive sampling can deal with abnormal sensor readings gracefully. Moreover, data reconstruction is not sensitive to packet losses. In compressive sampling, all data received by the data sink are equally important. This is different from distributed source coding, where received data are predefined as main or side information and thus loss of main information will cause serious errors in decoding.

While aspects of described techniques relating to data gathering in large-scale wireless sensor networks can be implemented in any number of different computing systems, environments, and/or configurations, embodiments are described in context of the following exemplary system architecture(s).

Illustrative Data Gathering in Large-Scale Wireless Sensor Networks

Figure 2:
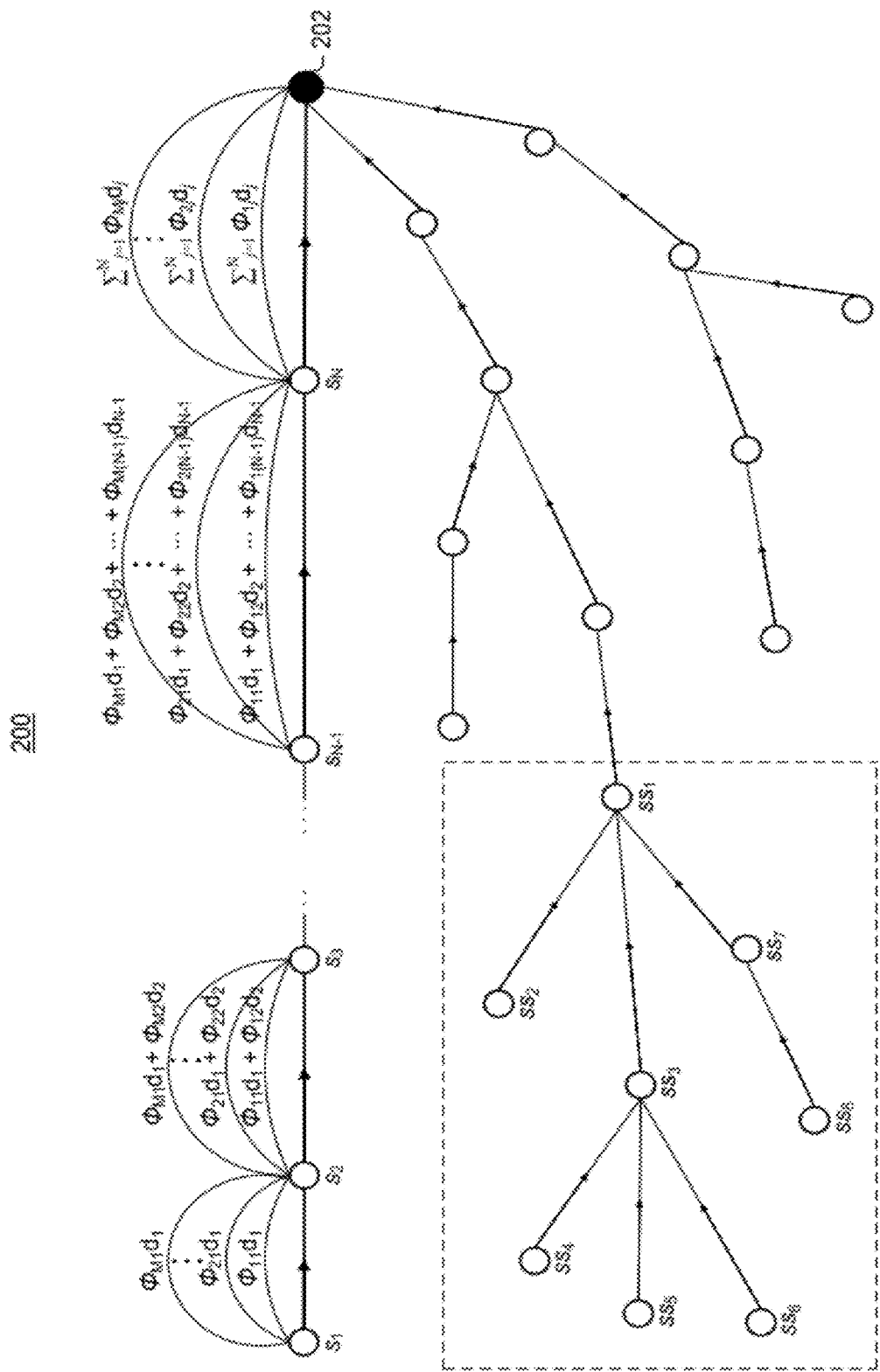
FIG. 2 illustrates data gathering in a large-scale wireless sensor network according to one embodiment.

The basic idea of the proposed compressive data gathering is depicted in FIG. 2, which illustrates data gathering in a large-scale wireless sensor network 200 according to one embodiment. Rather than receiving relayed sensor readings, the data collection device 202 receives a number of weighted sums of all the readings. Each sensor node in the network transmits M weighted sums to its parent node, which is a neighboring node that is one hop closer to the data collection device 202, and M is a positive integer. For example, to transmit the $i^{th}$ to the data collection device 202, sensor node $s_1$ multiplies its sensor reading $d_1$ with a pseudo-random coefficient $\Phi_{i1}$ and transmits the product, $\Phi_{i1}d_1$, to its parent node $s_2$. Here, the index i denotes the $i^{th}$ weighted sum ranging from 1 to M. Similarly, sensor node $s_2$ multiplies its sensor reading $d_2$ with a pseudo-random coefficient $\Phi_{i2}$ and adds the product, $\Phi_{i2}d_2$, to the received product $\Phi_{i1}d_1$, and then transmits the aggregate result, $\Phi_{i1}d_1+\Phi_{i2}d_2$, to its parent node $s_3$. Accordingly, each sensor node $s_j$ contributes to the relayed message by adding its own product. Finally, the data collection device 202 receives a weighted sum of all the sensor readings, $$\sum_{j=1}^{N} \Phi ijdj.$$

This process is repeated using M sets of different weights so that the data collection device 202 will receive M weighted sums.

Figure 1:
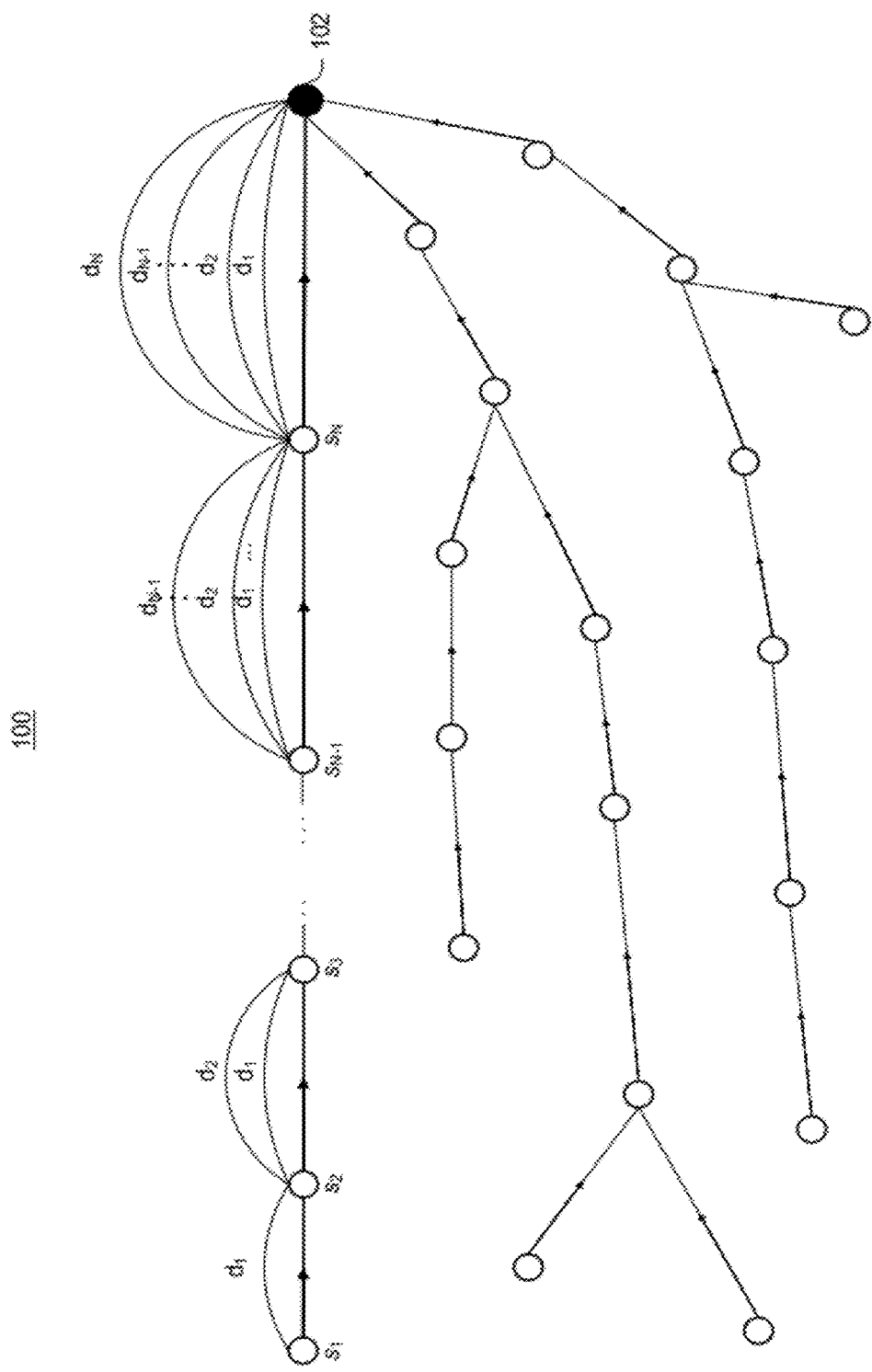
FIG. 1 illustrates convention data gathering in a large-scale wireless sensor network.

Accordingly, all sensor nodes in the network transmit M messages and consume the same amount of energy. Each node only performs one addition and one multiplication in order to compute one weighted sum. Comparing FIG. 1 and FIG. 2, it can be seen that although the first M nodes transmit more messages in the proposed compressive data gathering scheme than in a conventional scheme, the rest of nodes transmit less messages in the compressive data gathering scheme. When N, the number of nodes in a data gathering route, is large and M is much smaller than N, the proposed compressive data gathering scheme can significantly reduce the total number of transmissions and thereby save energy consumption. In general, the communication cost with a baseline transmission scheme as shown in FIG. 1 is in the order of N(N+1)/2, whereas the communication cost with the proposed compressive data gathering scheme as shown in FIG. 2 is in the order of NM. In addition, higher efficiency can be achieved if correlated sensor readings are transmitted jointly rather than separately.

In practice, as sensors are usually deployed in a two-dimensional area, the ensemble of routing paths tends to present a tree structure as shown in FIG. 2. In FIG. 2, the data collection device 202 has three children, each of which leading a sub-tree. Data gathering and reconstruction of compressive data gathering are performed on the sub-tree basis. In order to combine sensor readings while relaying the sensor readings, every sensor node needs to know its local routing structure. That is, each node knows whether or not a given node is a leaf node in the routing tree or how many children the node has if it is an inner node. In one embodiment, when a node selects a neighboring node to be its parent node, the node transmits a "subscribe notification" to the selected parent node. When a node changes parent, the node transmits an "unsubscribe notification" to the ex-parent node.

The compressive data gathering scheme can be described with reference to the routing tree in the dash-lined section of FIG. 2. After the sensors in the nodes $ss_1$-$ss_8$ acquire their readings, the leaf nodes initiate the transmission. For example, the node $ss_2$ generates a pseudo-random number, or coefficient, $\Phi_{i2}$, computes $\Phi_{i2}d_2$, and transmits the value to its parent node $ss_1$. The node $ss_4$, $ss_5$ and $ss_6$ transmit $\Phi_{i4}d_4$, $\Phi_{i5}d_5$ and $\Phi_{i6}d_6$ to their parent node $ss_3$. Once node $ss_3$ receives the three values from its children nodes, it computes $\Phi_{i3}d_3$, adds it to the sum of relayed values and transmits $$\sum_{j=3}^{6} \Phi ijdj$$

to its parent node $ss_1$. Similarly, the node $ss_8$ transmits $\Phi_{i8}d_8$ to its parent node $ss_7$, which adds $\Phi_{i7}d_7$ to the received data and transmits the sum to its parent node $ss_1$. The node $ss_1$ computes $\Phi_{i1}d_1$ and subsequently transmits $$\sum_{j=1}^{8} \Phi ijdj$$

to its parent node. Finally, the data is forwarded to the data collection device 202, which contains the weighted sum of all readings in the sub-tree.

Assuming that there are N nodes in a particular sub-tree, then the $i^{th}$ weighted sum can be represented by:

$$y_i = \sum_{j=1}^{N} \Phi ijdj \qquad (1)$$

For this sub-tree, the data collection device 202 obtains M weighted sums $\{y_i\}$, where i=1, 2 . . . M. Mathematically, equation (1) can be expressed as:

$$\begin{pmatrix} y1 \\ y2 \\ \vdots \\ yM \end{pmatrix} = \begin{pmatrix} \Phi 11 & \Phi 12 & \ldots & \Phi 1N \\ \Phi 21 & \Phi 22 & \ldots & \Phi 2N \\ & \vdots & & \\ \Phi M1 & \Phi M2 & \ldots & \Phi MN \end{pmatrix} \begin{pmatrix} d1 \\ d2 \\ \vdots \\ dN \end{pmatrix} \qquad (2)$$

In equation (2), each column of $\{\Phi_{ij}\}$ contains the series of pseudo-random numbers, or coefficients, each of which generated at a corresponding node. In order to avoid transmitting this pseudo-random matrix from the sensor nodes to the data collection device 202, the data collection device 202 broadcasts a random seed to the entire network before data transmission by the sensor nodes. Each sensor node uses this random seed and its respective identification to generate the series of pseudo-random numbers. This generation process can be reproduced by the data collection device 202 to recover the $\{\Phi_{ij}\}$ matrix.

In equation (2), $d_i$ (where i=1, 2 . . . N) is a scalar value. In a practical sensor network, each node may include one or more sensors with each sensor being of a type different from the other. For example, one sensor of a given sensor node may be a temperature sensor while another sensor of the given sensor node may be a pressure sensor. Accordingly, sensor readings from each sensor node can be seen as a multi-dimensional vector. In one embodiment, sensor readings of each type are separated out and processed respectively. In another embodiment, since the pseudo-random coefficients $\Phi_{ij}$ are irrelevant to sensor readings, $d_i$ may be treated as a vector. The weighted sums $y_i$, in such case, become vectors of the same dimension as well.

Recovery of Spatially Correlated Data

Figure 3:
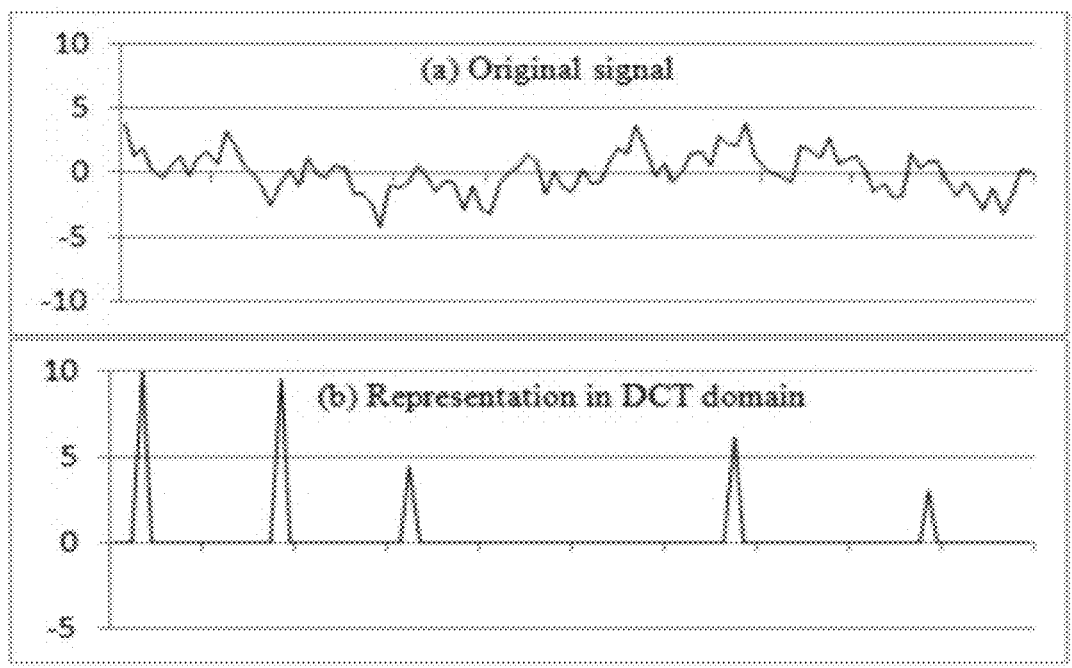
FIG. 3 illustrates a transmitted signal and its representation in discrete cosine transform domain.

According to compressive sampling theory, a K-sparse signal can be reconstructed from a small number of measurements with a probability close to 1. The weighted sums obtained in equation (2) are measurements of a typical type. Signal sparsity characterizes the correlations within a signal. Signal sparsity can be in one or more domains including temporal domain, frequency domain, and spatial domain. An N-dimensional signal is considered as a K-sparse signal if there exists a domain in which this signal can be represented by K (where K<<N) non-zero coefficients. FIG. 3(*a*) shows an illustrative 100-dimensional signal in its original time domain and, as can be seen, the signal is not sparse in this domain. Because of the signal correlation, the signal can be described more compactly in transform domain such as wavelet and discrete cosine transform (DCT). FIG. 3(*b*) shows a representation of the same signal in DCT domain. As can be seen, there are only five non-zero DCT coefficients. Therefore, this signal is a 5-sparse signal in the DCT domain.

In a densely deployed sensor network, sensors have spatial correlation in their readings. Let N sensor readings form a vector $d=[d_1\ d_2\ \ldots\ d_N]^T$, then d is a K-sparse signal in a particular domain $\psi$. Denote $\Psi=[\psi_1\ \psi_2\ \ldots\ \psi_N]$ as the representation basis with vectors $\{\psi_i\}$ as columns, and $x=[x_1\ x_2\ \ldots\ x_N]^T$ are the corresponding coefficients. The, d can be represented in the $\psi$ domain as:

$$d = \sum_{i=1}^{N} x_i \psi_i, \text{ or } d = \Psi_x \quad (3)$$

According to the compressive sampling theory, a K-sparse signal can be reconstructed from M measurements if M satisfies the following condition:

$$M \geq c \cdot \mu^2(\Phi, \Psi) \cdot K \cdot \log N \quad (4)$$

where c is a positive constant, $\Psi$ is the sampling matrix as defined in equation (2), and $\mu(\Phi, \Psi)$ is the coherence between sampling basis $\Phi$ and representation basis $\Psi$. The coherence metric measures the largest correlation between any two elements of $\Phi$ and $\Psi$, and is defined as:

$$\mu(\Phi,\Psi) = \sqrt{N} \cdot \max_{1 \leq i,j \leq N} |\langle \Phi_i, \psi_i \rangle| \quad (5)$$

From equation (5), it can be seen that the smaller the coherence between $\Phi$ and $\Psi$ is, the fewer measurements are needed to reconstruct the signal. In practice, it is a convenient choice to use random measurement matrix, since a random basis has been shown to be largely incoherent with any fixed basis, and M=3K~4K is usually sufficient to satisfy equation (4).

With sufficient number of measurements, the data collection device 202 is able to reconstruct sensor readings by solving an $l_1$-minimization problem:

$$\min_{x \in \mathbb{R}^N} \|x\|_{l_1} \text{ s.t. } y = \Phi d, \quad d = \Psi x \quad (6)$$

In addition, for sparse signals whose random projections are contaminated with noise, reconstruction can be achieved by solving a relaxed $l_1$-minimization problem, where $\epsilon$ is a predefined error threshold:

$$\min_{x \in \mathbb{R}^N} \|x\|_{l_1} \text{ s.t. } \|y - \Phi d\|_{l_2} < \epsilon, \quad d = \Psi x \quad (7)$$

Suppose x is the solution to this convex optimization problem, the proposed reconstruction of the original signal is $d=\overline{\Psi} \overline{x}$. Hence, the $\Psi$ matrix describes the correlation pattern among sensor readings. For example, if sensor readings are piece-wise smooth, wavelet transform matrix such as $\Psi$ may be used. It shall be noted that sensors do not use the correlation pattern during data gathering process. The correlation pattern is used by the data collection device 202 or another computing device during data recovery.

Recovery of Data with Abnormal Sensor Readings

Figure 4:
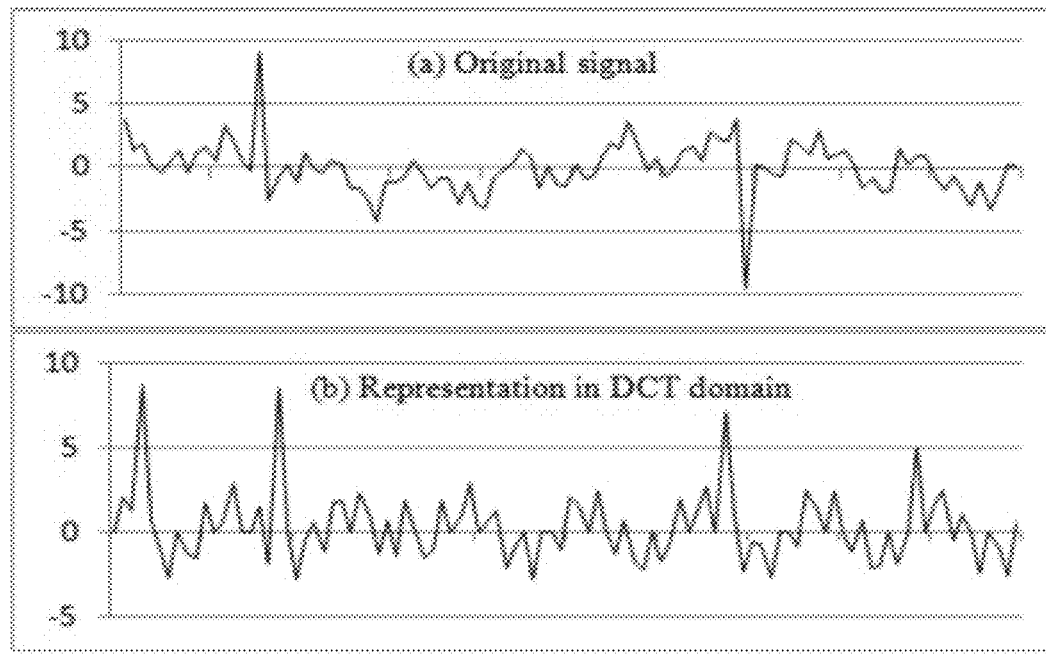
FIG. 4 illustrates the transmitted signal of FIG. 3 with two abnormal readings and its representation in discrete cosine transform domain.

When abnormal events take place, the sparsity of sensor readings tends to be compromised. As an example, FIG. 4(*a*) differs with FIG. 3(*a*) only by two abnormal readings. The corresponding DCT coefficients shown in FIG. 4(*b*) are not sparse. Therefore, the signal in FIG. 4 is not sparse in either the time domain or the transform domain. In this situation, conventional compression techniques require transmission of significantly more data by the sensor nodes in order to reconstruct the original signal. However, as a result, distributed source coding techniques will have considerable degradation.

To address the issue with abnormal readings, in one embodiment, sensor data readings are decomposed into two vectors:

$$d = d_0 + d_s \quad (8)$$

where $d_0$ contains the normal readings that are sparse in a certain transform domain, and $d_s$ contains the deviated values of abnormal readings. Since abnormal readings are sporadic in nature, $d_s$ is a sparse signal in the time domain. Suppose the normal readings are sparse in the $\Psi$ domain, then equation (8) can be rewritten as:

$$d = \Psi x_0 + I x_s \quad (9)$$

where I is the identical matrix, and both $x_0$ and $x_s$ are sparse. Thus, signal d is decomposed into two signals which are sparse in different domains. An overcomplete basis $\Psi'' = [\Psi\ I]$ can be constructed, and d is sparse in the $\Psi''$ domain:

$$d = \Psi'' x, x = [x_0^T x_0^T]^T \quad (10)$$

By incorporating equation (10) into equation (6) or (7), signal recovery with abnormal readings can be solved similarly by the $l_1$-norm optimization. Existing research can show that stable recovery under a combination of sufficient sparsity and favorable structure of the overcomplete system is possible. Moreover, existing research can also show that stable recovery of sparse signal in an overcomplete dictionary also works for noisy data, and the optimally-sparse approximation to the noisy data, to within the noise level. The result differs from the optimally-sparse decomposition of the ideal noiseless signal by at most a constant multiple of the noise level.

Suppose x is a vector of length 2N, and is the solution to the $l_1$-minimization problem defined in equation (7) when an overcomplete dictionary is used. Similarly, the original sensor readings can be reconstructed by $d=\Psi'x$. Denote $\underline{x}_s$ as an N-dimensional vector composed of the last N elements of $\underline{x}$, then the non-zero values in $\underline{x}_s$ indicate the positions of abnormal readings.

Figure 5:
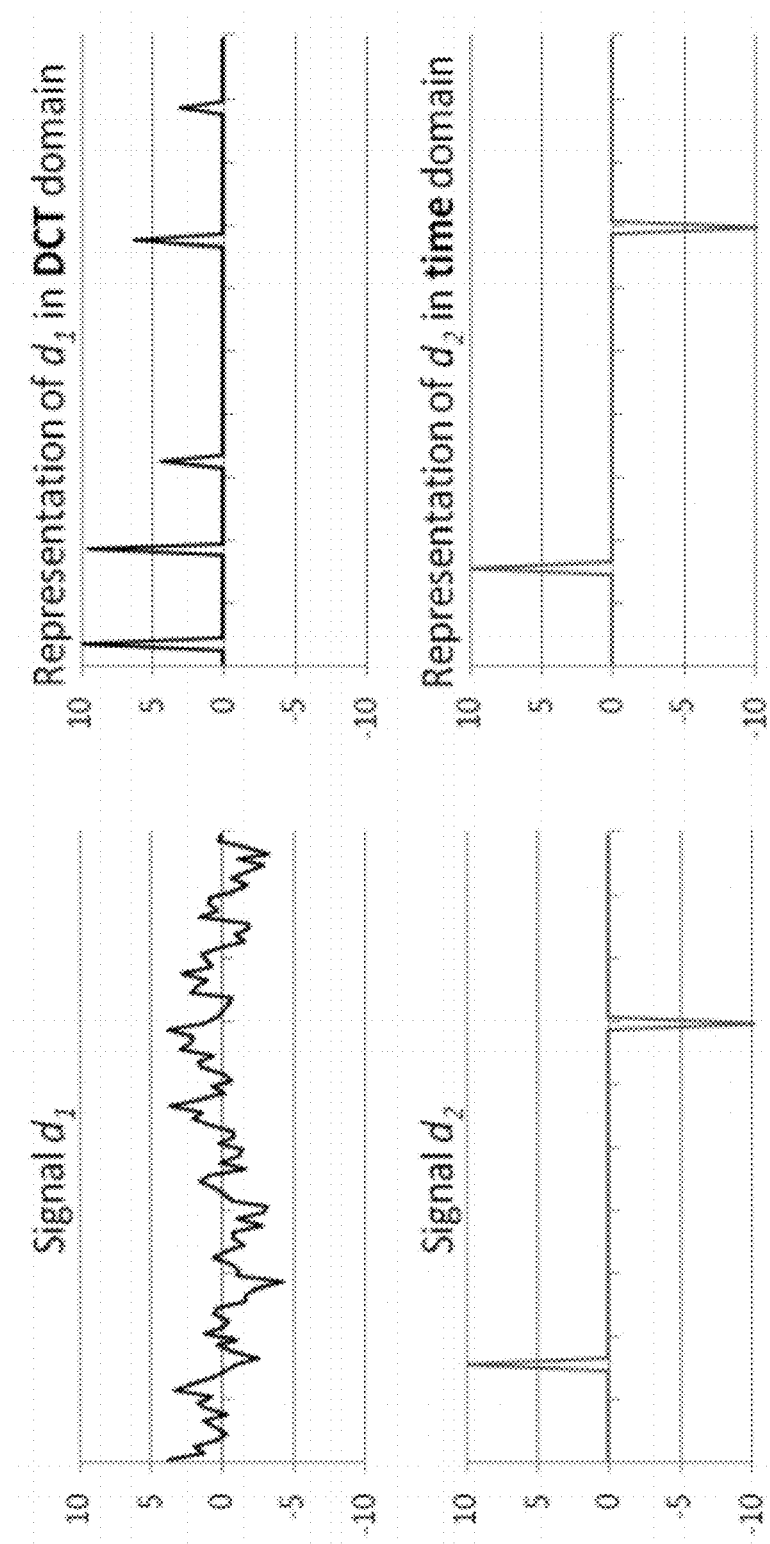
FIG. 5 illustrates the transmitted signal of FIG. 4 decomposed into two signals.

For example, as shown in FIG. 5, the signal d of FIG. 4(a) with two abnormal readings may be decomposed into two vectors $d_1$ and $d_2$, where $d_1$ represents the signal of FIG. 3(a) without the two abnormal readings and $d_2$ represents the two abnormal readings. That is, $d_1$ is a 5-sparse signal in the DCT domain as previously discussed with reference to FIG. 3(b) and $d_2$ is a 2-sparse signal in the time domain. Consequently, the signal d of FIG. 4(a) can be represented as a 7-sparse signal as $d=d_1+d_2=\Psi x_1+Ix_2=[\Psi\ I][x_1^T\ x_2^T]^T$ as shown in FIG. 5.

Recovery of Data Without Sparsity in any Intuitively Known Domain

Figure 6:
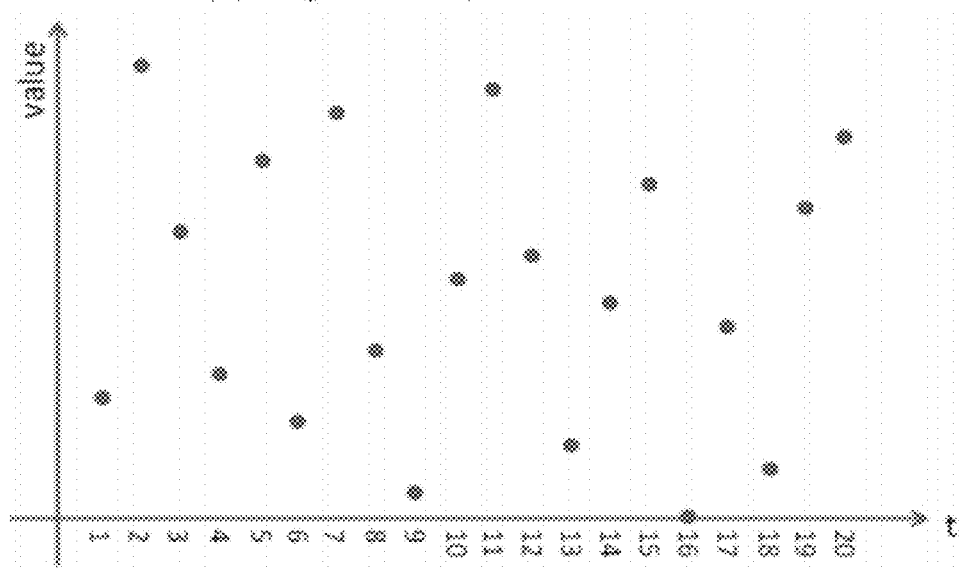
FIG. 6 illustrates the concept of data reordering according to the present disclosure.
Figure 6:
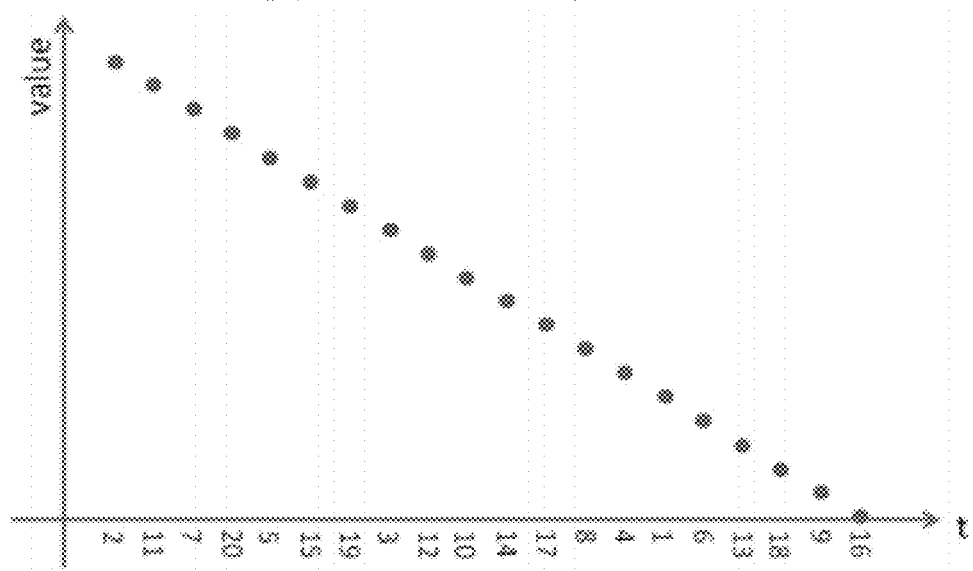

If a signal is not sparse in any intuitively known domain, data recovery is still possible by reshuffling, or reordering, data points of the signal. The basic concept is illustrated in FIG. 6. FIG. 6(a) shows an original collection of data points over time without sparsity in any intuitively known domain. In this example, the data points represent sensor reading values at different points in time. By reordering the data points in the time domain t, the data points can be re-organized in a descending order in values to result in an apparently sparse signal as shown in FIG. 6(b). To further illustrate the point, an experiment of temperature readings in a data center was carried out and will now be discussed.

Figure 7:
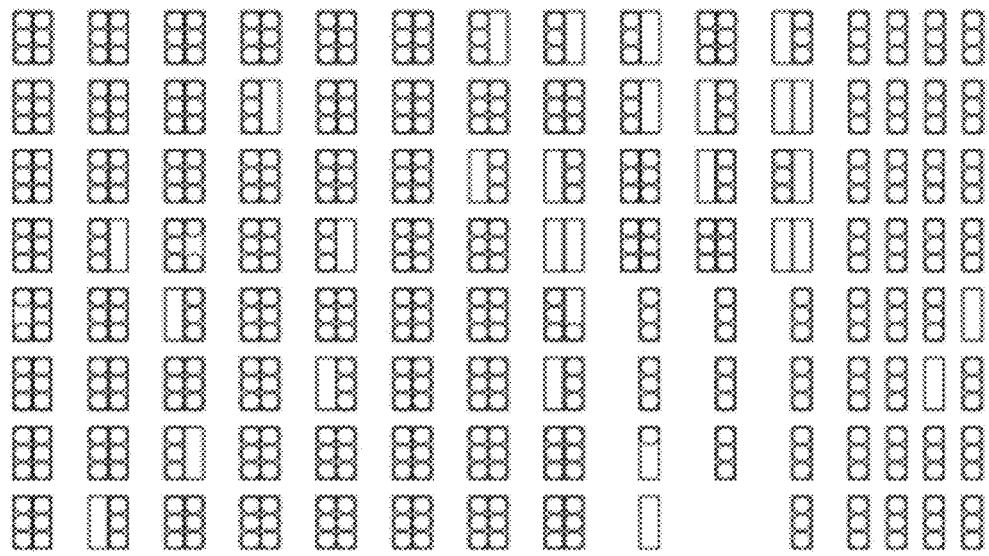
FIG. 7 illustrates an exemplary diagram of data center temperature sensing.
Figure 7:
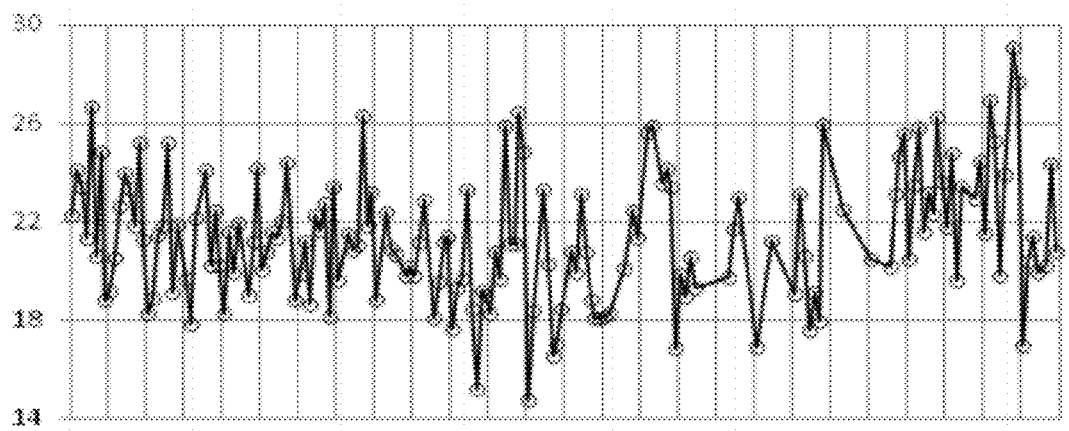

A contemporary application of wireless sensor networks is the monitoring of server temperatures in data centers. The temperature of a server is generally indicative of server load and, thus, abnormal temperature readings tend to indicated warning. FIG. 7(a) shows rack and temperature sensor locations in a data center, where each rectangular shape represents a rack and each oval shape indicates a sensor placed at the top, middle, or bottom of a respective rack. As shown in FIG. 7(a), most of the racks are equipped with three sensors while some racks are not monitored and a few other ones have only one or two sensors. In this experiment, there are 498 temperature sensors total. Temperature data are measured every 30 seconds and transmitted to a data sink through a baseline scheme. In this network, each node only communicates with adjacent nodes. For simplicity, it is assumed that all 498 sensors form one sub-tree to the data sink. The energy gain over baseline scheme is similar if sensors form two or more sub-trees.

FIG. 7(b) shows a snapshot of sensor readings from the temperature sensors. For clarity, only the sensor readings from the bottom of each rack (167 sensors total) are shown and the data of each column are placed side by side. One observation on this set of data is that the sensor readings exhibit little or no apparent spatial correlations. In other words, these data are not sparse in any intuitively known domain. Although the racks are physically close to one another, temperature readings are dominated by server loads rather than by ambient temperature. The entire data set containing sensor readings from all 498 sensors were checked and they are not apparently sparse either. Therefore, conventional compression mechanisms will fail in this situation.

Figure 8:
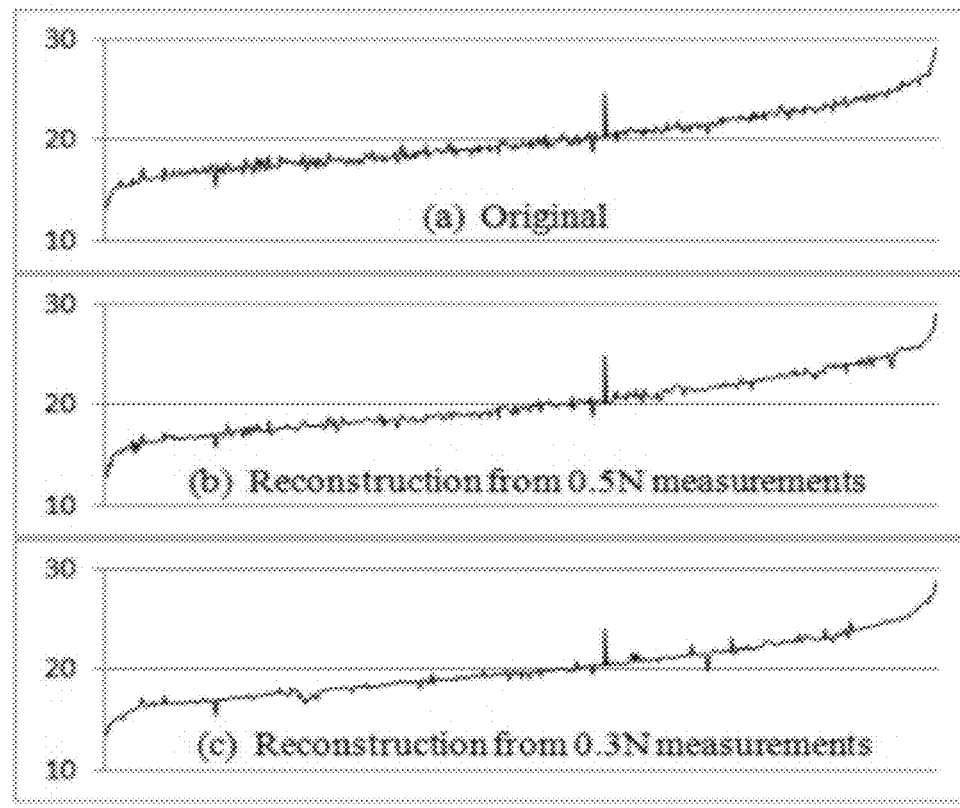
FIG. 8 illustrates an exemplary diagram of temperature sensor readings at one point in time.
Figure 9:
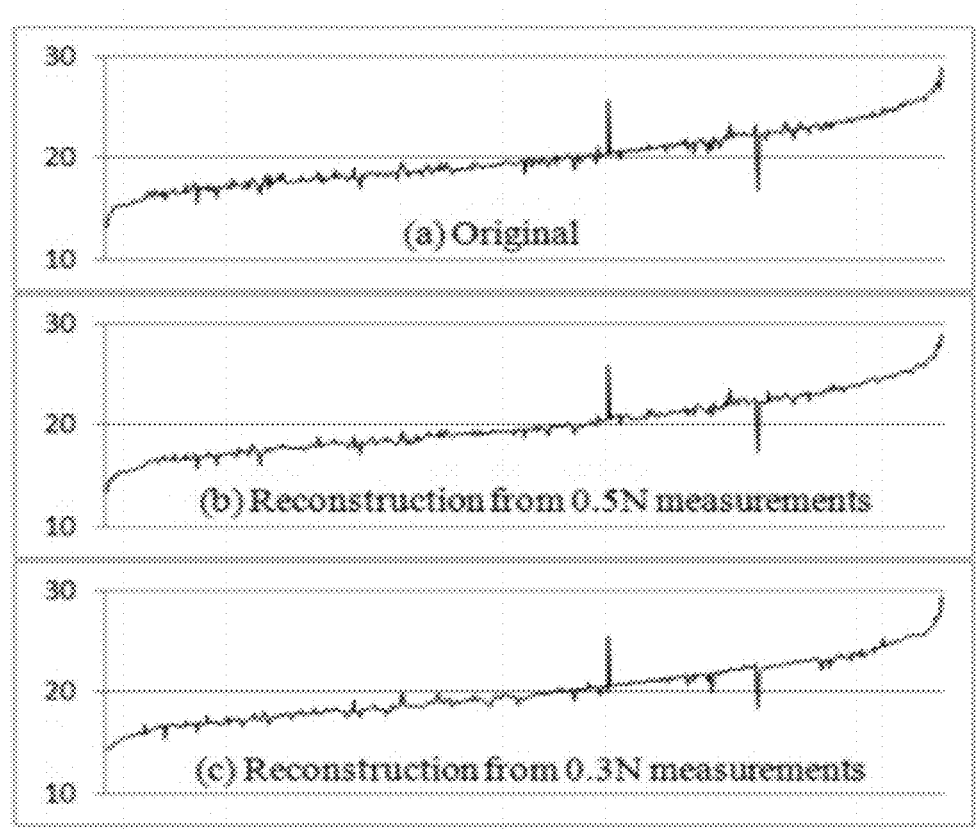
FIG. 9 illustrates an exemplary diagram of temperature sensor readings at another point in time.

With data reordering, the sensor readings $d_i$ can be reorganized into an apparently sparse signal. In particular, the sensor readings $d_i$ are sorted in ascending order according to their respective values at a particular moment $t_0$. The resulting vector d is piece-wise smooth and sparse in wavelet domain. Moreover, since server temperatures do not change violently, sensor readings collected within a relatively short time period can also be regarded as piece-wise smooth if organized in the same order. FIG. 8(a) and FIG. 9(a) show the ordered sensor readings 10 minutes and 30 minutes after $t_0$, respectively. They are generally in ascending order with only some small fluctuations. There are also a few significant spikes indicating abnormal temperature readings.

Based on the proposed compressive data gathering scheme, the noisy sparse signals with spikes can be reconstructed from M random measurements, where M<N. FIGS. 8(b) and 8(c) and FIGS. 9(b) and 9(c) show the reconstruction results from M=0.5N and M=0.3N measurements at two time instances. The average reconstruction precision is over 98%. More importantly, the abnormal readings are accurately captured.

To cope with the situation that temporal correlation becomes weak when the time interval increases, in one embodiment the ordering of $d_i$ is refreshed periodically. For example, for every one or two hours, the data sink requests M random measurements, where M=N, in one data gathering process. When M=N, the variables in equation (2) are solvable and the data sink is able to obtain the exact values of $d_i$. Afterwards, the data sink can re-sort $d_i$ and use this new ordering for data reconstruction in the subsequent hour or two.

Both conventional compression and distributed source coding are unable to exploit this type of sparsity which is observed only at certain reshuffled ordering. In conventional compression, explicit data communication is required between correlated nodes. If correlated nodes are not physically close to each other, the communication between them may take multiple hops. This introduces high overheads and makes compression procedure costly. In distributed source coding, nodes are classified into main nodes and side nodes. The data sink allocates appropriate number of bits to each node according to the correlation pattern. However, if the correlation pattern is based on changing sensor ordering, the data sink needs to carry out these two tasks and communicate the results to every single node periodically. In contrast, the data gathering process in compressive data gathering is unaffected, even when the ordering of $d_i$ changes. The knowledge of correlation is only used in the data reconstruction procedure.

Chain-Type Topology

Figure 10:
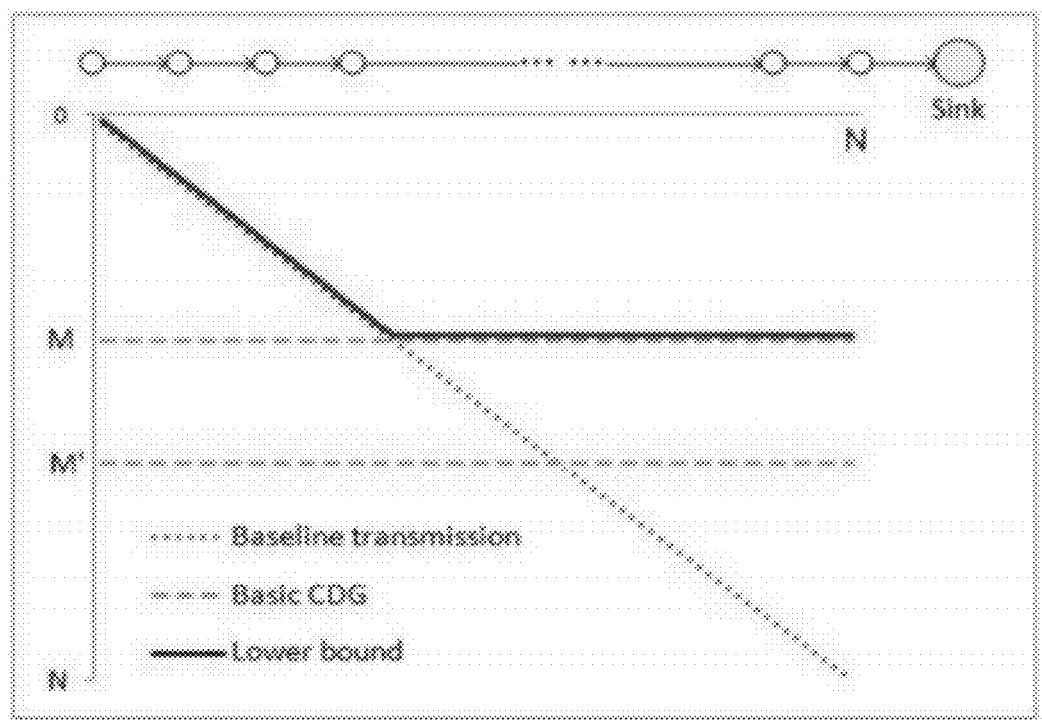
FIG. 10 illustrates sensor transmission loads in baseline transmission and basic compressive data gathering schemes.

As described above, FIG. 1 illustrates the baseline transmission scheme while the upper portion of FIG. 2 illustrates the basic compressive data gathering (CDG) scheme in a chain-type topology. The graph in FIG. 10 compares the communication costs of the two schemes. The horizontal axis represents sensor nodes from leaf to the data sink, and the vertical axis represents the number of messages sent by each node. It can be seen that the basic compressive data gathering scheme tends to have a small bottleneck load M. Yet, when the required number of measurements increases (e.g., from M to M'), the global communication cost of the basic compressive data gathering scheme could be even higher than that of the baseline transmission scheme. To overcome such drawback, in one embodiment, without additional sparsity assumption over partial sensor readings, the lower-bound communication cost of each sensor node is the smaller of the number of messages transmitted in the two schemes shown in FIG. 10. In other words, the baseline transmission scheme is adopted for the first M sensor nodes, while the compressive data gathering scheme is adopted for the remaining N−M sensor nodes in a chain, where M and N are positive integers and M is less than N. Thus, M of the N sensor nodes transmit their sensor readings in accordance with the baseline transmission scheme as shown in FIG. 1 while the remaining N−M sensor nodes transmit sensor readings (including sensor readings from their own sensors and those from their child nodes, if any) in accordance with the compressive data gathering scheme as shown in FIG. 2.

In terms of mathematical expression, $\Phi$ is split into two parts, denoted as $\Phi=[\Phi_1\ \Phi_2]$, where $\Phi_1$ is an M×M sub-matrix, and $\Phi_2$ is an N×(N−M) sub-matrix. The entries in $\Phi_2$ can still be drawn according to N(0, 1/M), i.e., $\Phi_2=R$, but the entries in $\Phi_1$ need to be re-designed.

The second choice for $\Phi_1$ is the identity matrix. With $\Phi$ denoted as $\Phi=[I\ R]$, the transmission scheme can be named IR-CDG. The $\Phi$ matrix can be written as follows:

$$\Phi = \begin{pmatrix} 1 & 0 & \cdots & 0 & | & \Phi_{1M+1} & \cdots & \Phi_{1N} \\ 0 & 1 & \cdots & 0 & | & \Phi_{2M+1} & \cdots & \Phi_{2N} \\ \vdots & \vdots & \ddots & \vdots & | & \vdots & & \vdots \\ 0 & 0 & \cdots & 1 & | & \Phi_{MM+1} & \cdots & \Phi_{MN} \end{pmatrix} \quad (11)$$

By using [I R] as the measurement matrix, the first M sensor nodes simply transmit their original sensor readings to sensor node $s_{M+1}$. Upon receiving the reading from sensor node $s_i$, sensor node $s_{M+1}$ computes the $i^{th}$ product and transmits $d_i+\Phi_{M+1i}d_{M+1}$ to the next node. In IR-CDG, the first M sensor nodes do not have any computation load, and the rest of the sensor nodes, or the remaining N−M sensor nodes, have the same computation and communication load as in the basic compressive data gathering scheme.

As can be seen in equation (11), the measurement matrix is composed of the weights, or coefficients, with which sensor nodes multiply their readings. In one embodiment, all the entries of the measurement matrix are drawn from Gaussian distribution N(0, 1/M). In another embodiment, a maximum of M columns can be drawn from the identity matrix of dimension M, and the entries of the rest of the columns are drawn from Gaussian distribution N(0, 1/M).

Tree-Type Topology

In many sensor networks, such as wireless sensor networks, sensors spread out in a two-dimensional area, and the routing paths from sensors to the data sink may present a tree structure. In a first scenario, sensor nodes are similarly equipped, so load balancing in measurement generation is a critical issue. In a second scenario, certain nodes are more powerful than others in terms of storage, computation capability, and power supply. Accordingly, the application of compressive data gathering can be more flexible in the second scenario.

When the compressive data gathering scheme is applied to homogeneous networks with tree-type routing structure, compressive data gathering is performed on sub-tree basis, i.e., the data sink solves the set of linear equations from each direct neighbor separately. Assuming that the $i^{th}$ sub-tree contains $N_i$ sensor nodes, the readings can be recovered from $M_i$ measurements. Every node in this sub-tree transmits $M_i$ messages.

Similar to the chain-type topology, matrix [I R] can be used for measurement generation in each sub-tree. In other words, at most $M_i$ nodes can send one original reading instead of $M_i$ weighted sums. Different from the chain-type topology, the nodes which send original readings do not have to be the first $M_i$ nodes in vector d. Since shuffling the columns of the measurement matrix does not change its RIP, we can freely choose these nodes, and assign them with a different sequence number between 1 and $M_i$. for the sake of communication cost reduction, it is preferred that these nodes are leaf nodes or close to the periphery of the routing tree. Ideally, IR-CDG can reduce $M_i(M_i-1)$ transmissions in the $i^{th}$ sub-tree when compared to the basic compressive data gathering scheme.

Figure 11:
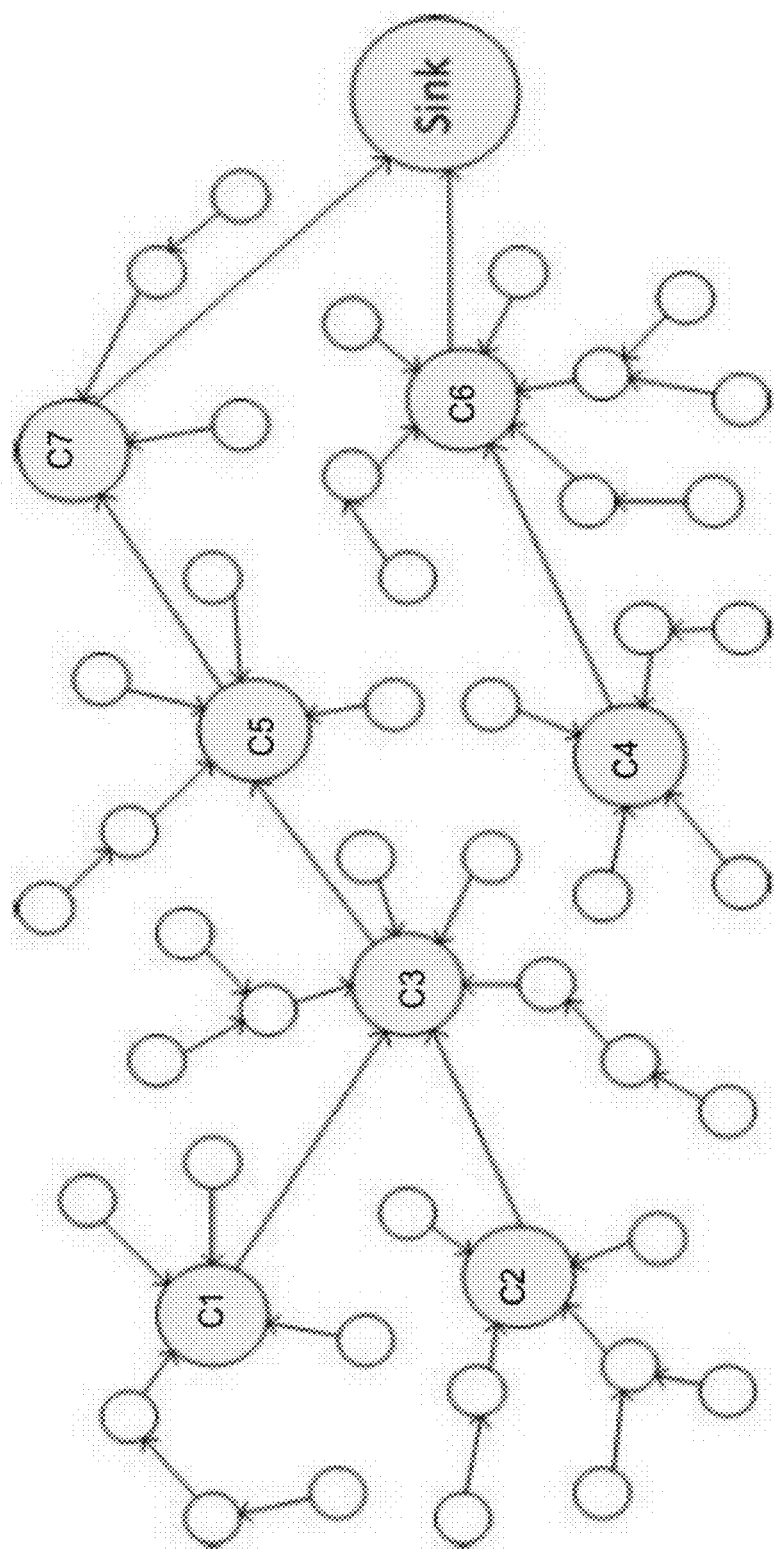
FIG. 11 illustrates an exemplary cluster-based routing structure.

It is very common in wireless sensor nodes that certain number of power nodes or transmission units are deployed in strategic locations to relieve the transmission loading on other nodes. FIG. 11 illustrates a typical two-tier network in which common sensor nodes communicate with respective cluster heads C1-C7 either directly or through a few relays. The cluster heads C1-C7 form a second-tier relay network, either chain-type or tree-type, to transmit data to the data sink. Although seven cluster heads are shown in FIG. 11, different number of cluster heads may be employed.

In such heterogeneous networks, the sensor nodes can be divided into sub-trees, and [I R] can be used as the measurement matrix in each sub-tree. However, since routing trees are quite shallow in this case, the number of leaf nodes are usually larger than $M_i$ in each sub-tree. More efficiently, the additional storage and computational power of the cluster heads C1-C7 can be utilized to reduce the communication costs of the common nodes. In particular, each common node may transmit original sensor readings to its respective cluster head, and each of the cluster heads C1-C7 generates random coefficients and computes weighted sums for all nodes in its cluster. In the second tier network, the cluster heads add up the weighted sums from different clusters while relaying the sums to the data sink. As shown in FIG. 11, for example, the leaf nodes of the cluster heads C1-C7 transmit sensor readings to the respective cluster heads which in turn transmit the sensor readings (including those from the sensors associated with the cluster heads) either directly to the data sink or to another one of the cluster heads C1-C7. It is clear that the measurement matrix formed in this way is also a full Gaussian random matrix. It has exactly the same RIP as the random measurement matrix formed in the basic compressive data gathering scheme.

Illustrative Computing Device

Figure 12:
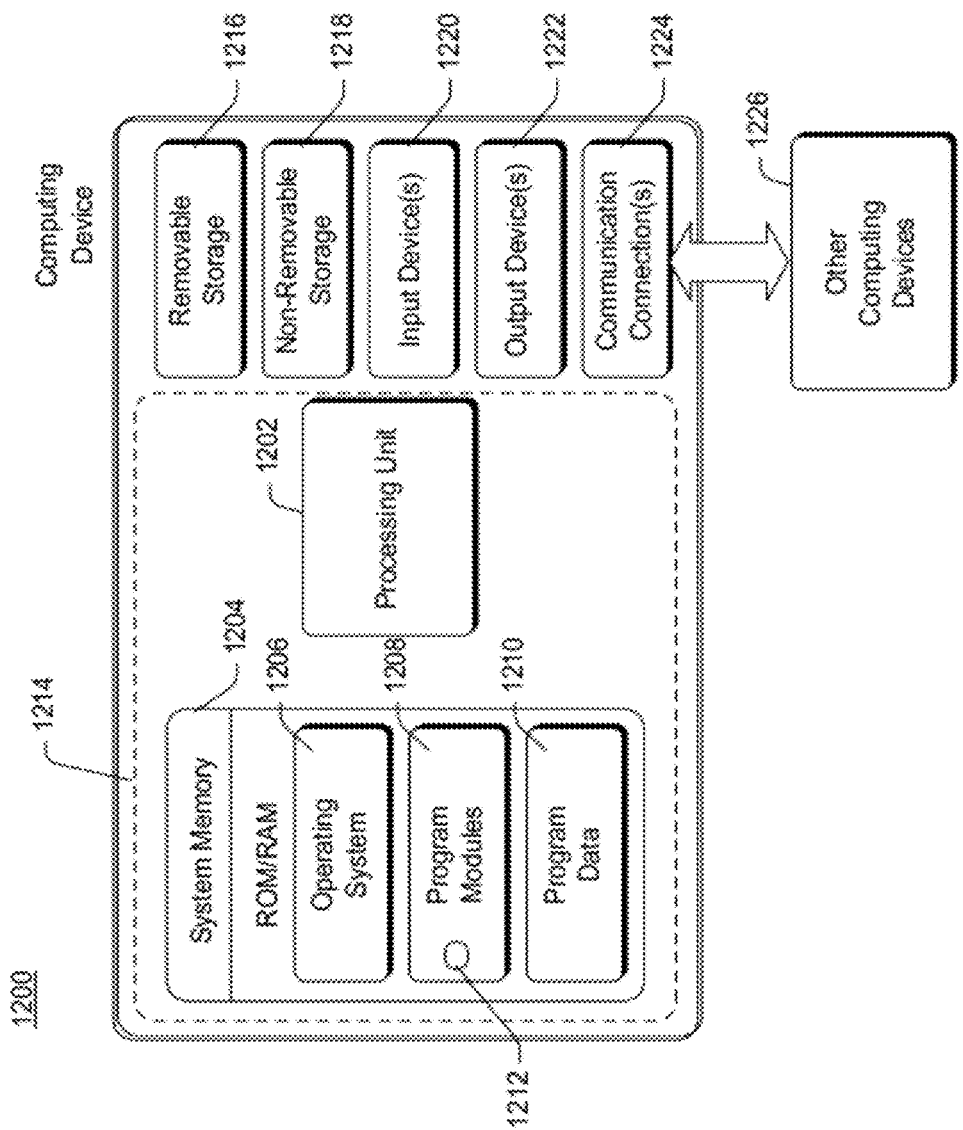
FIG. 12 illustrates a block diagram of an illustrative computing device that may be used to perform data gathering in a wireless sensor network.

FIG. 12 illustrates a representative computing device 1200 that may implement the techniques for data gathering and recovery. However, it will be readily appreciated that the techniques disclosed herein may be implemented in other computing devices, systems, and environments. In one embodiment, the data collection device 202 of FIG. 2 may be implemented with the computing device 1200. In another embodiment, any one of the sensor node of FIG. 2 may be implemented with the computing device 1200. The computing device 1200 shown in FIG. 12 is only one example of a computing device and is not intended to suggest any limitation as to the scope of use or functionality of the computer and network architectures.

In at least one configuration, computing device 1200 typically includes at least one processing unit 1202 and system memory 1204. Depending on the exact configuration and type of computing device, system memory 1204 may be volatile (such as random-access memory, or RAM), non-volatile (such as read-only memory, or ROM, flash memory, etc.) or some combination thereof. System memory 1204 may include an operating system 1206, one or more program modules 1208, and may include program data 1210. The computing device 1200 is of a very basic configuration demarcated by a dashed line 1214. Again, a terminal may have fewer components but may interact with a computing device that may have such a basic configuration.

The program module 1208 includes a data gathering and recovery module 1212. When the data collection device 202 is implemented with the computing device 1200, the module 1212 is configured to recover sensor readings received from the sensor nodes of the network 200. For example, the module 1212 is capable of recovering sensor reading $d_i$ received from sensor node $s_i$, where i=1, 2 ... N, as described above. In one embodiment, the module 1212 is configured to carry out the process 600 as described below.

When a sensor node $s_i$ is implemented with the computing device 1200, the module 1212 is configured to generate a pseudo-random coefficient $\Phi_i$ using the random seed received from the data collection device 202, multiply sensor reading $d_i$ by the pseudo-random coefficient $\Phi_i$. If the particular sensor node $s_i$ is a parent node, the module 1212 is further configured to add the received data from its child node to the product $\Phi_i d_i$, and transmit the resultant aggregate data so that the aggregate data is eventually received by the data collection device 202. In one embodiment, the module 1212 is configured to carry out the process 700 as described below.

Computing device 1200 may have additional features or functionality. For example, computing device 1200 may also include additional data storage devices (removable and/or non-removable) such as, for example, magnetic disks, optical disks, or tape. Such additional storage is illustrated in FIG. 12 by removable storage 1216 and non-removable storage 1218. Computer storage media may include volatile and nonvolatile, removable and non-removable media implemented in any method or technology for storage of information, such as computer readable instructions, data structures, program modules, or other data. System memory 1204, removable storage 1216 and non-removable storage 1218 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1200. Any such computer storage media may be part of the computing device 1200. Computing device 1200 may also have input device(s) 1220 such as keyboard, mouse, pen, voice input device, touch input device, etc. Output device(s) 1222 such as a display, speakers, printer, etc. may also be included.

Computing device 1200 may also contain communication connections 1224 that allow the computing device 1200 to communicate with other computing devices 1226, such as over a network which may include one or more wired networks as well as wireless networks. Communication connections 1224 are some examples of communication media. Communication media may typically be embodied by computer readable instructions, data structures, program modules, etc.

It is appreciated that the illustrated computing device 1200 is only one example of a suitable device and is not intended to suggest any limitation as to the scope of use or functionality of the various embodiments described. Other well-known computing devices, systems, environments and/or configurations that may be suitable for use with the embodiments include, but are not limited to, personal computers (PCs), server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

Illustrative Operations

Figure 13:
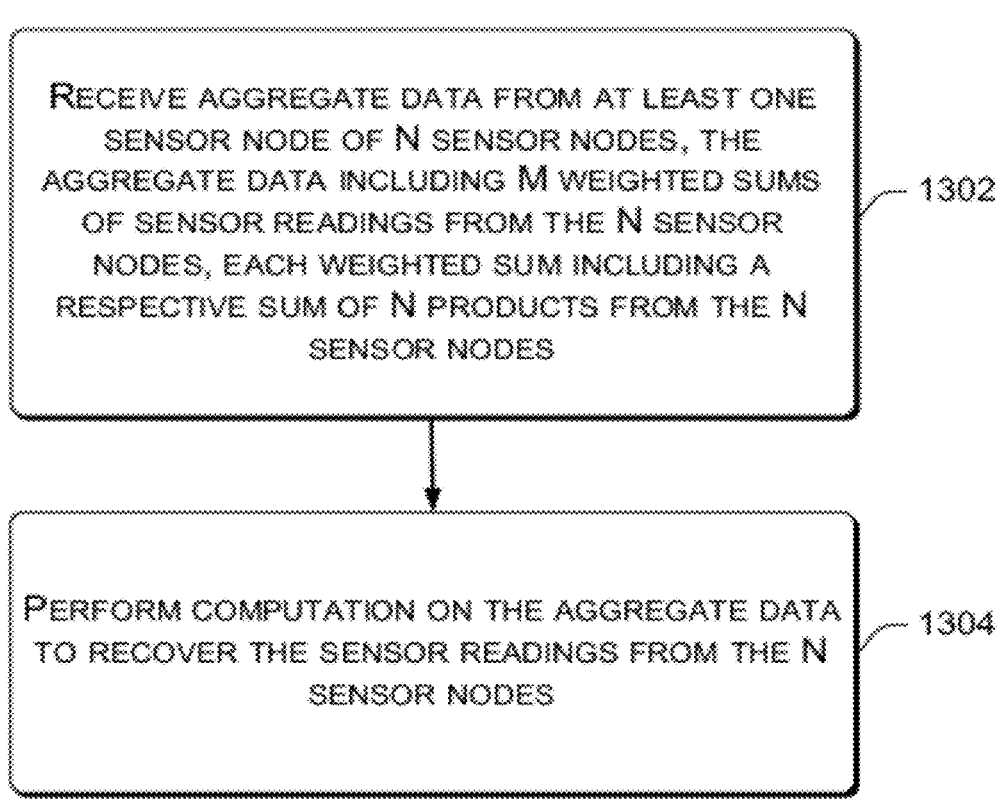
FIG. 13 illustrates a flow diagram of a process of data gathering in a large-scale wireless sensor network according to one embodiment.

FIG. 13 illustrates a process 1300 of data gathering by a data collection device in a large-scale wireless sensor network according to one embodiment.

At 1302, aggregate data from at least one sensor node of a group of N sensor nodes is received by the data collection device. The aggregate data includes M weighted sums of sensor readings from the N sensor nodes. Each of the M weighted sums includes a respective sum of N products from the N sensor nodes. Each of the N products of each of the M weighted sums is a product of a respective coefficient and a sensor reading from a respective one of the N sensor nodes. Here, M and N are both positive integers greater than zero and M is less than N. At 1304, computation is performed on the aggregate data to recover the sensor readings from the N sensor nodes.

For example, a data sink such as the data collection device 202 of FIG. 2 receives aggregate data from a sensor node, such as $s_N$, of a group of N sensor nodes. The aggregate data is a result of each of the N sensor nodes generating M pseudo-random coefficients with a random seed, multiplying its respective sensor reading with the M coefficients to produce M respective products. If a sensor node has not child node, it transmits its respective M respective products to its parent node. On the other hand, if a sensor node is a parent node of at least one other sensor node, the parent node adds the respective M products received from the child node to the respective M products of the parent node to arrive at a set of M values and then transmits those M values to its parent node. Accordingly, M different weighted sums of N products, constituting the aggregate data, will be transmitted by the last sensor node of a sub-tree of N sensor nodes to the data sink. In order for the sensor readings to be recoverable, M needs to be smaller than N but larger than K, which is the degree of sparsity of the sensor readings.

In one embodiment, the data sink receives the aggregate data as one data packet. Alternatively, the data sink receives the aggregate data as M data packets each having one of the M weighted sums.

After the data sink receives the aggregate data, the data sink performs computation on the aggregate data to recover the data collected by the N sensor nodes. Alternatively, the data sink forwards on the aggregate data to a network, computing device or communication device where computation is performed to recover the data collected by the first and the second sensors.

In one embodiment, in order to overcome the problem of data sparsity being compromised by abnormal sensor readings, the data sink or a computing device decomposes the received aggregate data into a first vector and a second vector. The first vector contains normal readings of the respective sensor that are sparse in a first transform domain. The second vector contains abnormal readings of the respective sensor that are sparse in a time domain.

For example, the sensor data d may be decomposed by the data sink into two vectors $d_0$ and $d_s$, or $d=d_0+d_s$, where $d_0$ contains the normal readings which are sparse in a certain transform domain and $d_s$ contains the deviated values of abnormal readings. Given that abnormal readings are typically sporadic, $d_s$ is a sparse signal in the time domain. Suppose the normal readings are sparse in $\Psi$ domain, then sensor data d can be expressed as $d=\Psi x_0 + I x_s$, where I is the identical matrix and both $x_0$ and $x_s$ are sparse. Thus, the sensor data is a composed of two signals that are sparse in different domains. Accordingly, the sensor data can be expressed as $d=\Psi'x$, where $x=[x_0^T x_s^T]^T$ and $\Psi=[\Psi\ I]$. It can be shown that stable recovery is possible under a combination of sufficient sparsity and favorable structure of the overcomplete system.

In one embodiment, when performing computation on the aggregate data, the coefficients used in the received aggregate data are reproduced. For example, the data collection device 202 may reproduce the M×N coefficients if the computation is performed by the data collection device 202 in order to recover sensor readings from N sensors. As the sensor readings are spatially correlated, the computation performed includes a discrete cosine transform computation using a spatial correlation between the first sensor and the second sensor to recover the data collected by the first sensor and the data collected by the second sensor.

In one embodiment, the data collection device 202 transmits the random seed to the sensor nodes before each of the sensor nodes starts transmitting data collected by the respective sensor. This way, each sensor node can generate its respective coefficient using the random seed. In one embodiment, at least one of the sensor nodes generates its respective pseudo-random coefficient using the random seed and the sensor node's identification, such as a serial number, a media access control (MAC) address, or any information that can be used to identify the respective sensor node. In one embodiment, data transmitted by each of the sensor nodes includes the identification of the respective sensor node, so the data collection device 202 can reproduce the coefficients with the random seed and the received identifications of the sensor nodes.

In one embodiment, the data collection device 202 further receives second aggregate data from a sensor node of a group of T sensor nodes. The second aggregate data is a result of each of the T sensor nodes generating Q pseudo-random coefficients with a random seed, multiplying its respective sensor reading with the Q coefficients to produce Q respective products. If a sensor node has not child node, it transmits its respective Q respective products to its parent node. On the other hand, if a sensor node is a parent node of at least one other sensor node, the parent node adds the respective Q products received from the child node to the respective Q products of the parent node to arrive at a set of Q values and then transmits those Q values to its parent node. Accordingly, Q different weighted sums of T products, constituting the aggregate data, will be transmitted by the last sensor node of a sub-tree of T sensor nodes to the data sink. In order for the sensor readings to be recoverable, Q needs to be smaller than T but larger than K, which is the degree of sparsity of the sensor readings.

Figure 14:
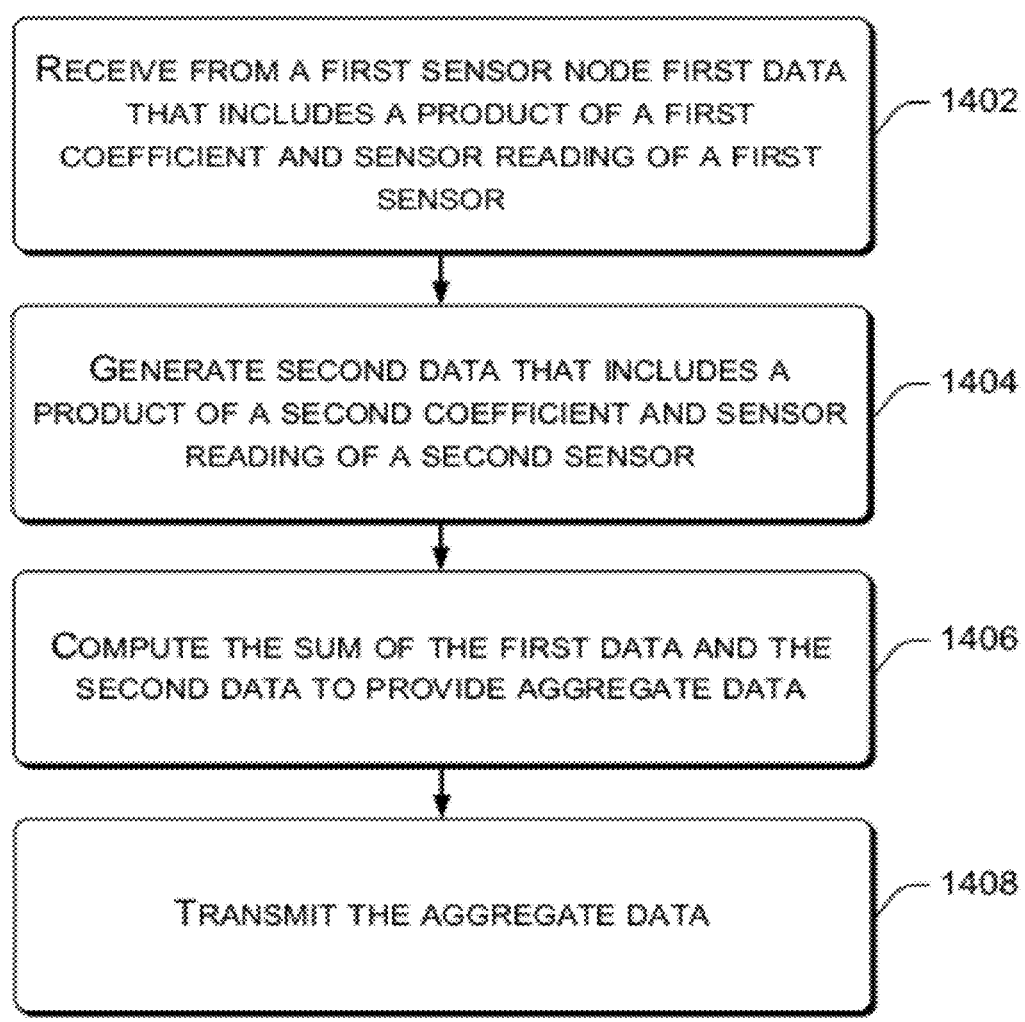
FIG. 14 illustrates a flow diagram of a process of data gathering in a large-scale wireless sensor network according to another embodiment.

FIG. 14 illustrates a process 1400 of data gathering in a large-scale wireless sensor network according to another embodiment.

At 1402, first data from a first sensor node is received, where the first data includes a product of a first coefficient and a sensor reading of a first sensor. At 1404, second data is generated to include a product of a second coefficient and a sensor reading of a second sensor. At 1406, the first data and the second data are summed together to produce aggregate data. At 1408, the aggregate data is transmitted. For example, a second sensor node is the parent node of the first sensor node. The second sensor node receives the first data from the first sensor node and combines the first data with the second data that is generated by the second sensor node to provide the aggregate data. The second sensor node then transmits the aggregate data for it to eventually be received by a data sink for further processing.

In one embodiment, in order to recover the sensor readings from the sensor nodes, the aggregate data is treated as having two vectors. The first vector contains normal readings of the sensors that are sparse in a first transform domain. The second vector contains abnormal readings of the sensors that are sparse in a time domain.

For example, the respective sensor data d may be treated by the data collection device 202 as consisting of two vectors $d_0$ and $d_s$, or $d=d_0+d_s$, where $d_0$ contains the normal readings which are sparse in a certain transform domain and $d_s$ contains the deviated values of abnormal readings. Given that abnormal readings are typically sporadic, $d_s$ is a sparse signal in the time domain. Suppose the normal readings are sparse in $\Psi$ domain, then sensor data d can be expressed as $d=\Psi x_0+Ix_s$, where I is the identical matrix and both $x_0$ and $x_s$ are sparse. Thus, the sensor data is a composed of two signals that are sparse in different domains. Accordingly, the sensor data can be expressed as $d=\Psi'x$, where $x=[x_0^T x_s^T]^T$ and $\Psi'=[\Psi\ I]$.

In one embodiment, the first coefficient is generated by the first sensor node using the random seed and an identification of the first sensor node. Likewise, the second coefficient is generated by the second sensor node using the random seed and an identification of the first sensor node.

In one embodiment, at least one of the first sensor node or the second sensor node includes a plurality of sensors, at least one sensor of the plurality of sensors being of a first type, at least one other sensor of the plurality of sensors being of a second type different from the first type. For example, the first sensor node may include a sensor that senses temperature and another sensor that senses pressure. Further, the second sensor may include a sensor that senses motion, which is different from the conditions or parameters sensed by the sensors of the first sensor node.

In one embodiment, a random seed is received from the data sink before the sensor nodes transmit data. This way, each of the sensor nodes can compute one or more coefficients using the random seed and the identification of the respective sensor node.

In one embodiment, the second sensor receives third data from a third sensor node. The third data includes a product of a third coefficient and data collected by a third sensor, where the third coefficient is generated by the third sensor node using a random seed, such as a random seed provided by the data sink. For example, the second sensor node may also be the parent node of the third sensor node. Accordingly, the aggregate data transmitted by the second sensor node includes not only the first data from the first sensor node and the second data from the second sensor node, but also the third data from the third sensor node.

In one embodiment, a fourth sensor node is selected to be a parent node by the second sensor node between the fourth sensor node and a fifth sensor node. Subsequently, the second sensor node transmits a subscribe notification to the fourth sensor node before transmitting the second data from the second sensor to the fourth sensor node. This way, both the second sensor node and the fourth sensor node are aware of their respective relationship to each other in the wireless sensor network.

In another embodiment, to change the parent node, the second sensor node transmits an unsubscribe notification to a fourth sensor node. Subsequently, the second sensor node transmits a subscribe notification to a fifth sensor node before transmitting the second data from the second sensor node to the fifth sensor node. Accordingly, the fifth sensor node becomes the new parent node of the second sensor node.

CONCLUSION

The above-described techniques pertain to data gathering in large-scale wireless sensor networks. Although the techniques have been described in language specific to structural features and/or methodological acts, it is to be understood that the appended claims are not necessarily limited to the specific features or acts described. Rather, the specific features and acts are disclosed as exemplary forms of implementing such techniques. Furthermore, although the techniques have been described in the context of data gathering in large-scale wireless sensor networks, the techniques may be applied in any other suitable context such as, for example, electrical power grid sensor networks.

What is claimed is:

1. A method of data gathering by a data collection device in a sensor network, the method comprising:
receiving aggregate data from at least one sensor node of a group of N sensor nodes each of which including at least one respective sensor, the aggregate data including M weighted sums of sensor readings, each weighted sum including a respective sum of N products each of which being a product of a respective coefficient and a sensor reading from a respective one of the N sensor nodes, M and N being positive integers and M<N; and
performing computation on the aggregate data to recover sensor readings from the N sensor nodes.

2. The method of claim 1, wherein the N sensor nodes form P clusters of sensor nodes, each $i^{th}$ cluster of the P clusters having a sensor node as the $i^{th}$ cluster head and at least one other sensor node transmitting respective sensor readings to the $i^{th}$ cluster head, the P cluster heads transmitting sensor readings either directly to the data collection device or to another one of the P cluster heads, P being a positive integer and P<N.

3. The method of claim 1, wherein the aggregate data is received by the data collection device as one data packet.

4. The method of claim 1, wherein the aggregate data is received by the data collection device from the $N^{th}$ sensor node as M data packets each of which including a respective one of the M weighted sums.

5. The method of claim 1, wherein the performing computation on the aggregate data to recover sensor readings from the N sensor nodes comprises reordering the sensor readings in a first domain to achieve sparsity of the sensor readings in a second domain.

6. The method of claim 1, wherein the performing computation on the aggregate data to recover sensor readings from the N sensor nodes comprises decomposing the aggregate data into a first vector and a second vector, the first vector containing normal readings of the respective sensor that are sparse in a first transform domain, the second vector containing abnormal readings of the respective sensor that are sparse in a time domain.

7. The method of claim 1, wherein at least one of the coefficients is generated by the respective sensor node using a random seed and an identification of the respective sensor node.

8. The method of claim 1, wherein the performing computation on the aggregate data to recover the sensor readings comprises:
reproducing the respective coefficients of the sensor nodes; and
performing computation using the reproduced respective coefficients to recover the sensor readings.

9. The method of claim 1, wherein the sensor readings are spatially correlated, and wherein the performing computation on the aggregate data to recover the sensor readings comprises:
performing a discrete cosine transform computation using a spatial correlation between at least two of the N sensor nodes to recover the sensor readings from the at least two of the N sensor nodes.

10. The method of claim 1, further comprising:
transmitting a random seed from the data collection device to the N sensor nodes before the N sensor nodes transmit data to report sensor readings to the data collection device; and
generating the respective coefficients by individual sensor nodes of the N sensor nodes using the random seed and an identification of the respective sensor node.

11. The method of claim 1, further comprising:
receiving second aggregate data from at least one sensor node of a group of T sensor nodes each of which including at least one respective sensor, the group of T sensor nodes not including any sensor node of the group of N sensor nodes, the second aggregate data including Q weighted sums of sensor readings, each weighted sum including a respective sum of Q products, each of the T products being a product of a respective coefficient and a sensor reading from a respective one of the T sensor nodes, Q and T being positive integers and Q<R; and
performing computation on the second aggregate data to recover the sensor readings from the T sensor nodes.

12. A method of data gathering in a sensor network, the method comprising:
receiving first data from a first sensor node by a second sensor node of a group of N sensor nodes, N being a positive integer, the first data including a product of a first coefficient and data collected by a first sensor, the first coefficient generated by the first sensor node using a random seed;
generating second data by the second sensor node, the second data including a product of a second coefficient and data collected by a second sensor, the second coefficient generated by the second sensor node using the random seed;
summing the first data and the second data to provide aggregate data; and
transmitting the aggregate data to report the aggregate data to a data collection device.

13. The method of claim 12, wherein each of the first data and the second data includes M products each of which being a product of a respective coefficient and the data collected by the respective first or second sensor, M being a positive integer less than N, wherein individual coefficients in the respective first or second data are generated using the random seed, and wherein at least one coefficient in the respective first or second data is different from one other coefficient in the respective first or second data.

14. The method of claim 12, wherein at least one of the first sensor node or the second sensor node includes a plurality of sensors, at least one sensor of the plurality of sensors being of a first type, at least one other sensor of the plurality of sensors being of a second type different from the first type.

15. The method of claim 12, further comprising:
generating the first coefficient by the first sensor node using the random seed and an identification of the first sensor node; and
generating the second coefficient by the second sensor node using the random seed and an identification of the second sensor node.

16. The method of claim 12, further comprising:
selecting a fourth sensor node to be a parent node by the second sensor node between the fourth sensor node and a fifth sensor node; and transmitting a subscribe notification from the second sensor node to the fourth sensor node before transmitting the second data from the second sensor to the fourth sensor node.

17. The method of claim 12, further comprising:
transmitting an unsubscribe notification from the second sensor node to a fourth sensor node; and
transmitting a subscribe notification from the second sensor node to a fifth sensor node before transmitting the second data from the second sensor node to the fifth sensor node.

18. One or more computer readable media storing computer-executable instructions that, when executed, perform acts comprising:
receiving aggregate data from at least one sensor node of a group of N sensor nodes each of which including at least one respective sensor, the aggregate data including M weighted sums of sensor readings and sensor readings from M of the N sensor nodes, each weighted sum including a respective sum of N−M products, each of the N−M products being a product of a respective coefficient and a sensor reading from a respective one of the N−M sensor nodes, M and N being positive integers and M<N; and
performing computation on the aggregate data to recover the sensor readings from the N sensor nodes.

19. The computer readable media of claim 18, wherein the performing computation on the aggregate data comprises performing computation on the aggregate data using a measurement matrix that has coefficients with which sensor readings are multiplied as entries of the measurement matrix, and wherein at least some of the entries of the measurement matrix are drawn from Gaussian distribution $N(0, 1/M)$.

20. The computer readable media of claim 19, wherein a maximum of M columns of the measurement matrix are drawn from an identity matrix of dimension M, and wherein the remaining of the entries of the measurement matrix are drawn from Gaussian distribution $N(0, 1/M)$.

* * * * *